(12) United States Patent
Gardner

(10) Patent No.: US 6,827,074 B2
(45) Date of Patent: Dec. 7, 2004

(54) METHOD AND APPARATUS FOR REMOVING TRIP HAZARDS IN CONCRETE SIDEWALKS

(75) Inventor: M. Ballard Gardner, Orem, UT (US)

(73) Assignee: Datigen.com, Inc., Provo, UT (US)

( * ) Notice: Subject to any disclaimer, the term of this patent is extended or adjusted under 35 U.S.C. 154(b) by 42 days.

(21) Appl. No.: 10/155,663

(22) Filed: May 24, 2002

(65) Prior Publication Data

US 2003/0217743 A1 Nov. 27, 2003

(51) Int. Cl.⁷ .................................................. B28D 1/32
(52) U.S. Cl. ........................ 125/25; 451/548; 451/450; 125/13.01
(58) Field of Search .................................. 451/353, 548; 451/450; 125/13.01, 25

(56) References Cited

U.S. PATENT DOCUMENTS

| | | | |
|---|---|---|---|
| 2,716,312 A | * | 8/1955 | Speicher ..................... 451/342 |
| 3,186,256 A | | 6/1965 | Reznick |
| 3,386,322 A | | 6/1968 | Stone et al. |
| 3,554,067 A | | 1/1971 | Scutella |
| 3,861,016 A | | 1/1975 | Johnson et al. |
| 3,946,631 A | | 3/1976 | Malm |
| 4,077,161 A | | 3/1978 | Wyle et al. |
| 4,516,560 A | * | 5/1985 | Cruickshank et al. ......... 125/15 |
| 4,570,609 A | * | 2/1986 | Hogue ..................... 125/13.01 |
| 4,637,289 A | | 1/1987 | Ramsden |
| 4,776,402 A | * | 10/1988 | Meikle et al. ............. 168/48.2 |
| 4,805,504 A | | 2/1989 | Fushiya et al. |
| 4,870,946 A | * | 10/1989 | Long et al. ............... 125/13.01 |
| 5,184,534 A | | 2/1993 | Lee |
| 5,243,727 A | * | 9/1993 | Tanaka et al. .................. 15/98 |
| 5,409,299 A | * | 4/1995 | Holder ....................... 299/41.1 |
| 5,718,621 A | * | 2/1998 | Turley ........................ 451/342 |
| 5,950,514 A | | 9/1999 | Benedict et al. |
| 6,287,181 B1 | * | 9/2001 | Dekok et al. ................ 451/353 |
| 6,418,829 B1 | | 7/2002 | Pilchowski |

FOREIGN PATENT DOCUMENTS

GB          1215064          12/1970

* cited by examiner

Primary Examiner—Lee D. Wilson
(74) Attorney, Agent, or Firm—Angus C. Fox, III

(57) ABSTRACT

Apparatus for cutting a chamfer on an upper edge of a concrete slab includes a hub designed for installation on the threaded output spindle of an angle grinder, and a specially-modified diamond-grit-edged rotary blade which mounts on the hub. For a preferred embodiment of the hub, an attachment collar is unitary and concentric with both a blade mounting flange having countersunk blade-attachment screw holes and a blade centering shoulder on the flange. The attachment collar has at least one pair of flattened parallel sides for receiving a wrench used to tighten the hub on the output spindle. The blade which is equipped with both countersunk attachment holes and a central positioning aperture sized to fit closely over the blade centering shoulder, is attachable with countersinking screws to the mounting flange so that the head of each screw is flush with the surface of the blade.

16 Claims, 14 Drawing Sheets

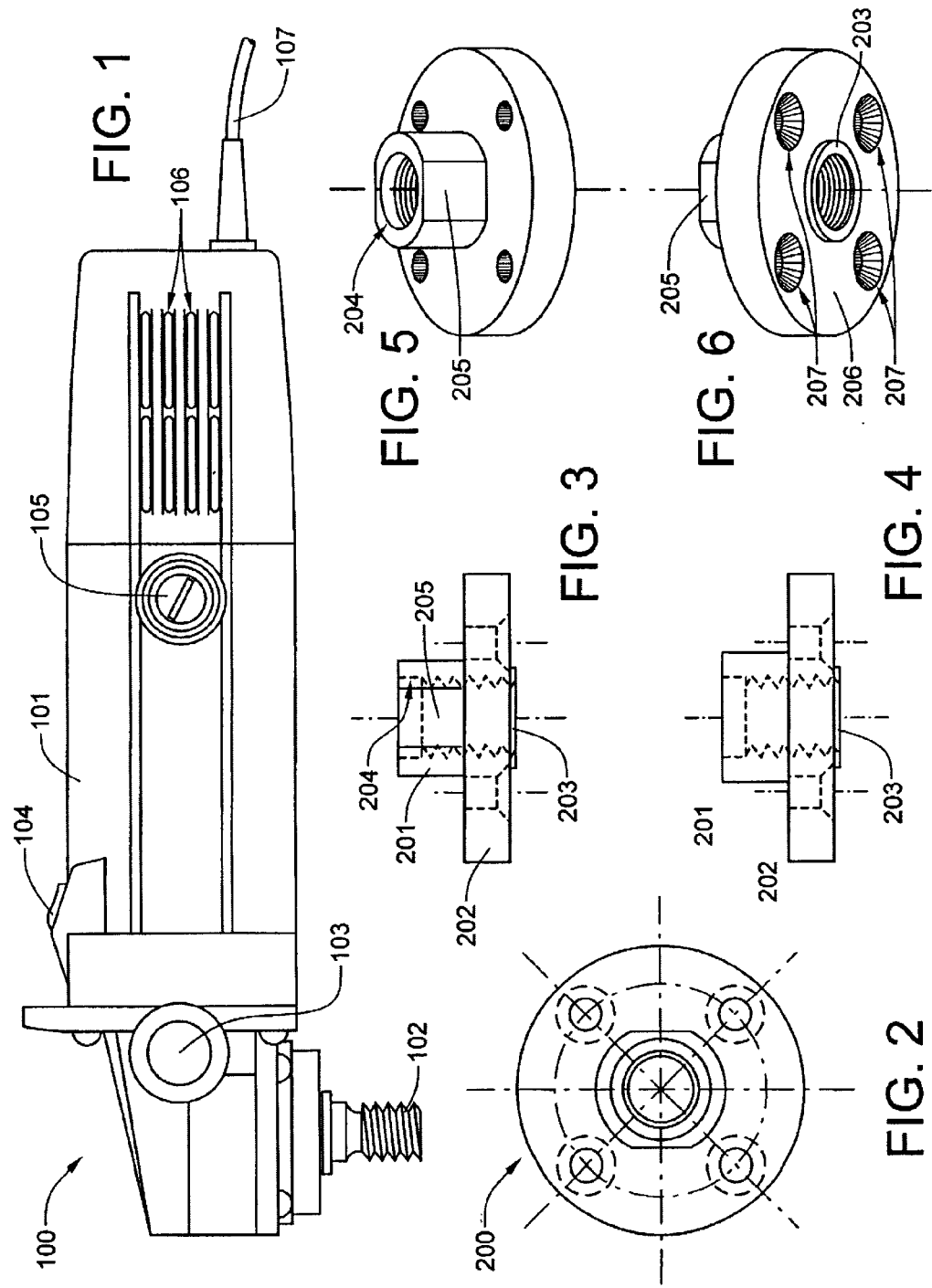

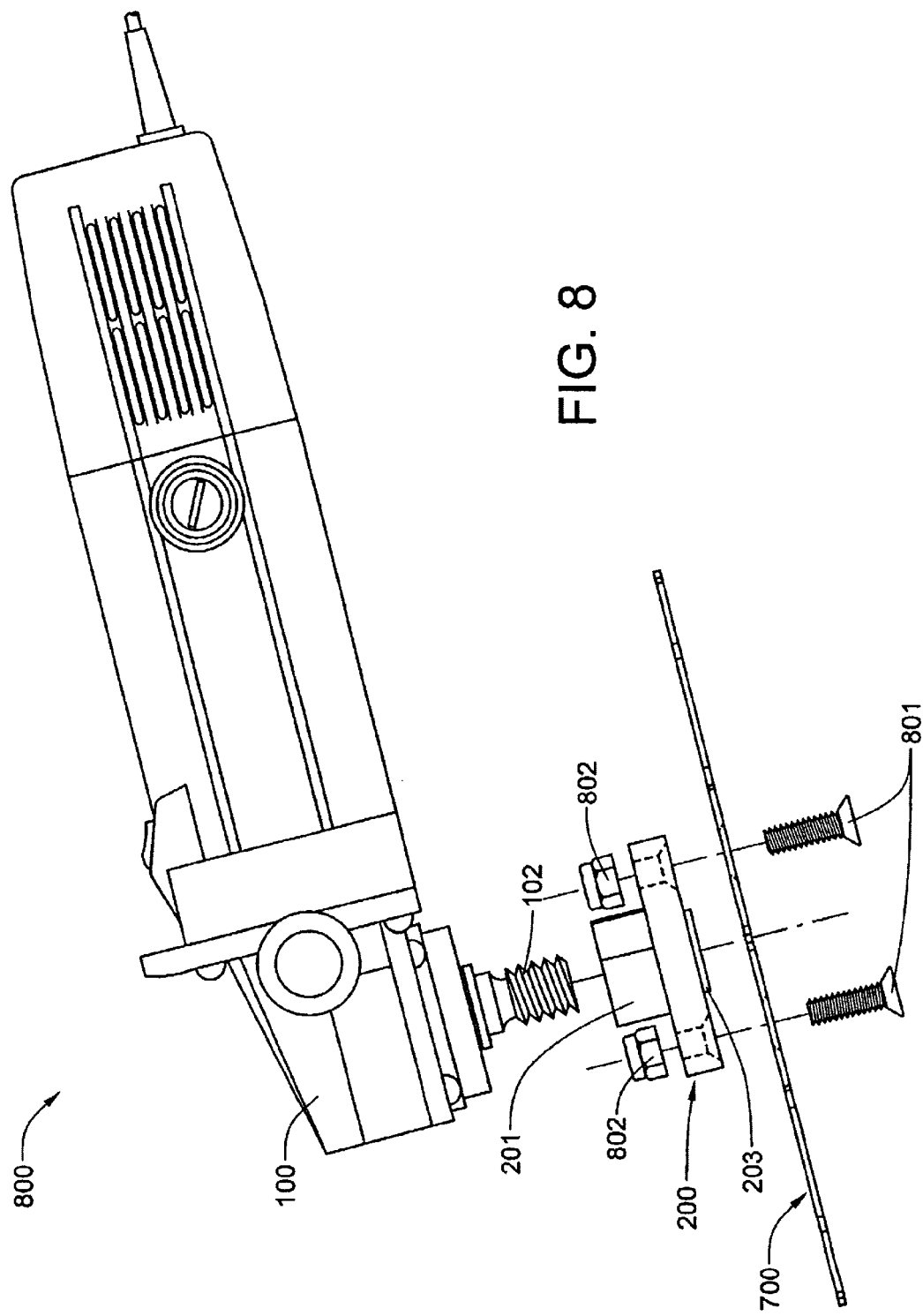

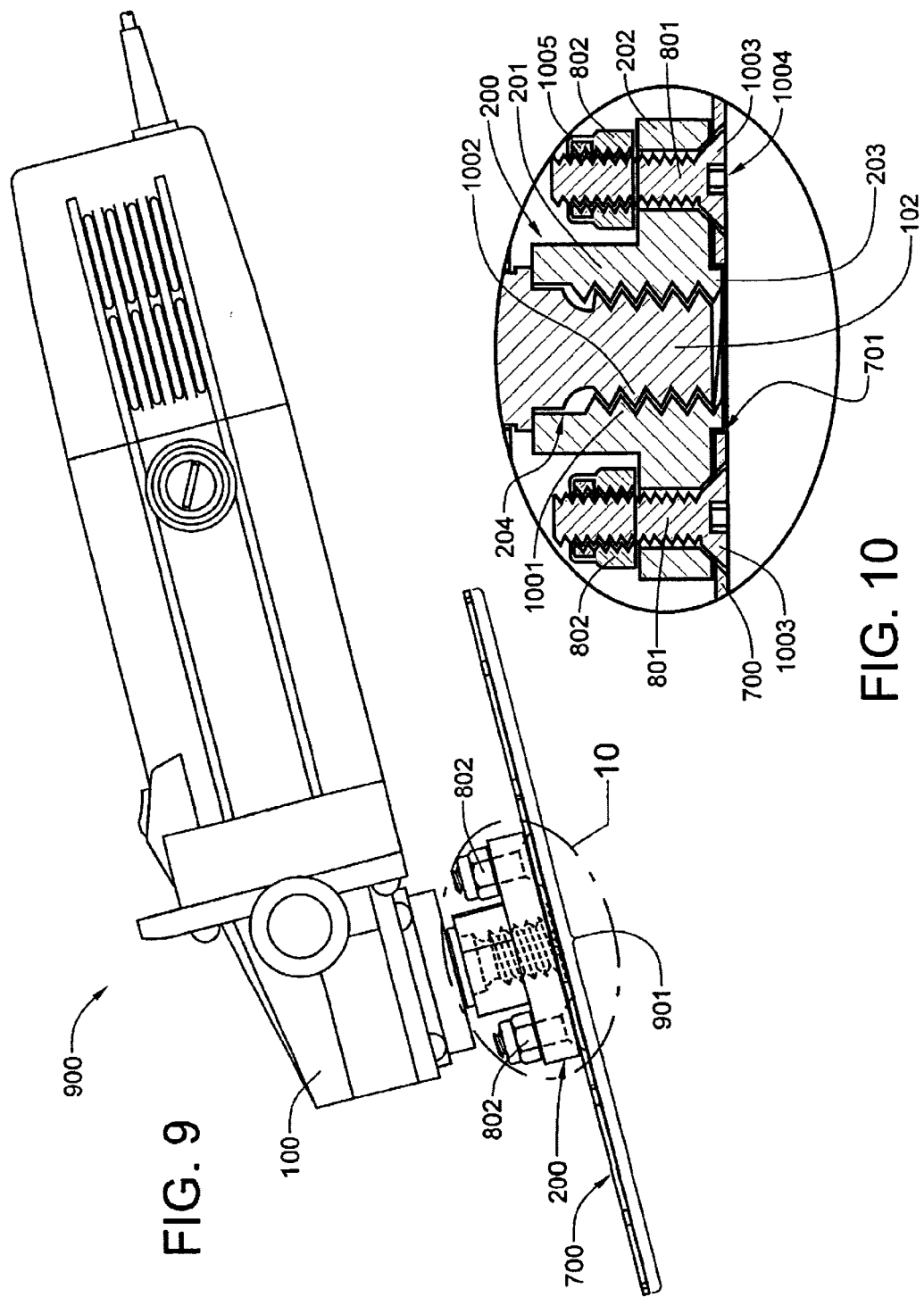

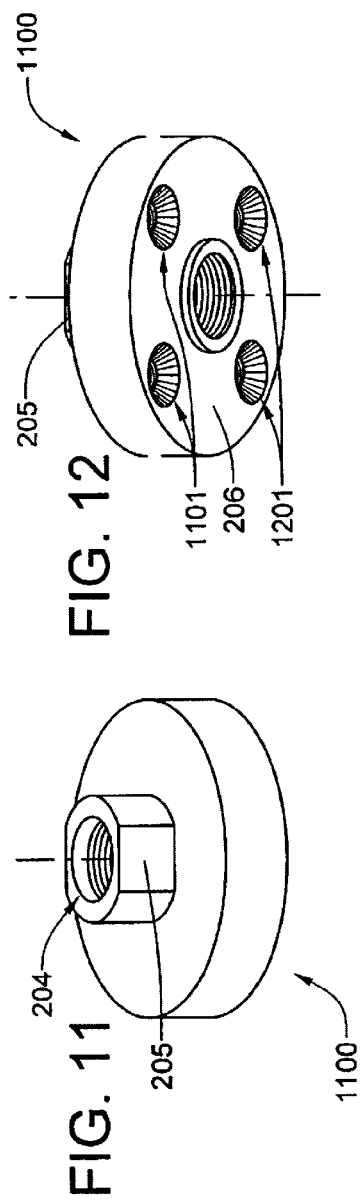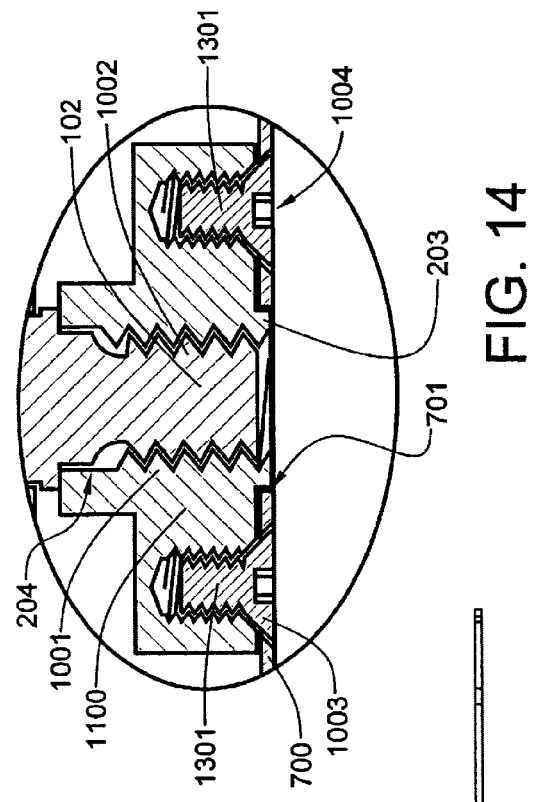

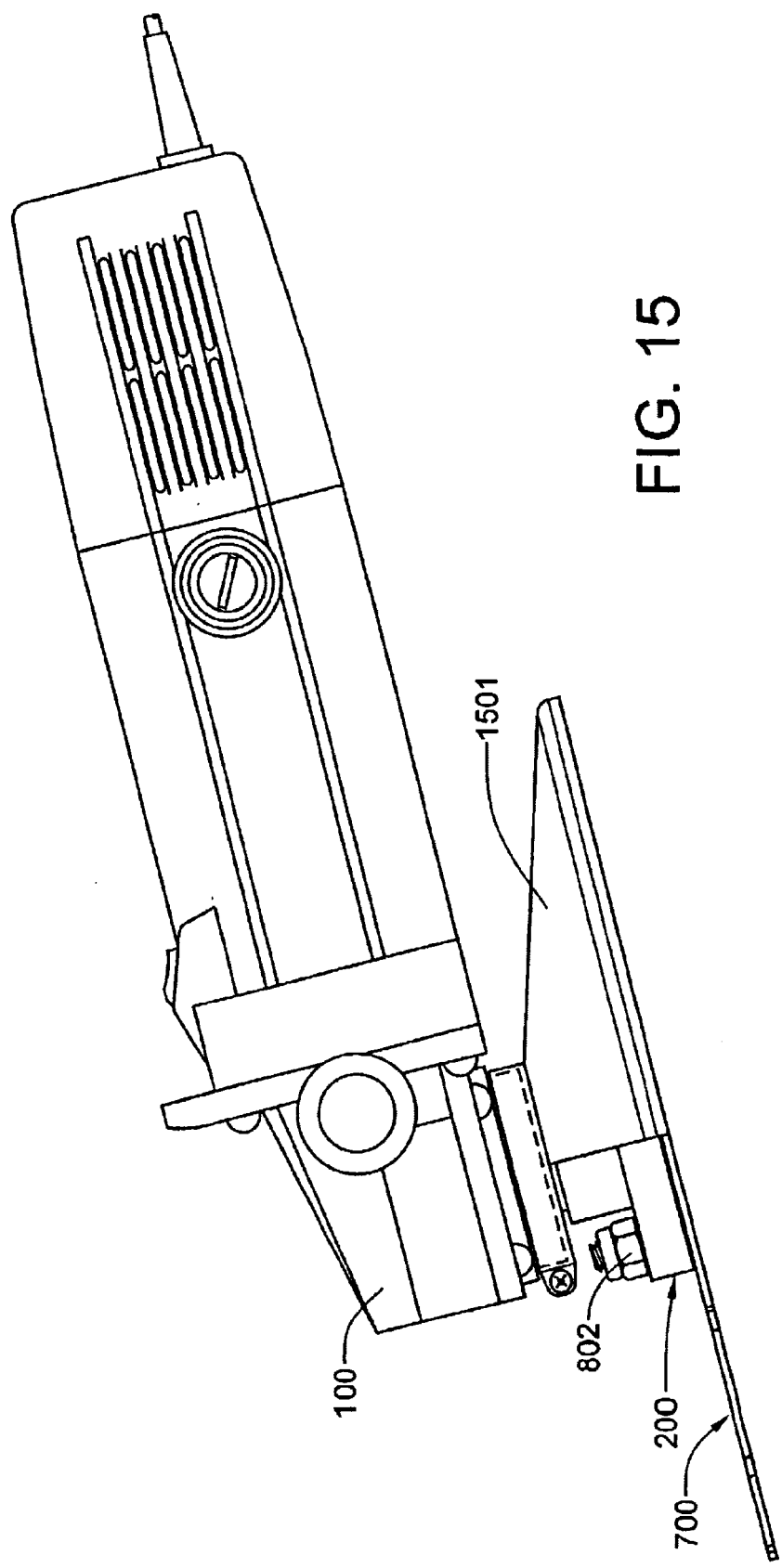

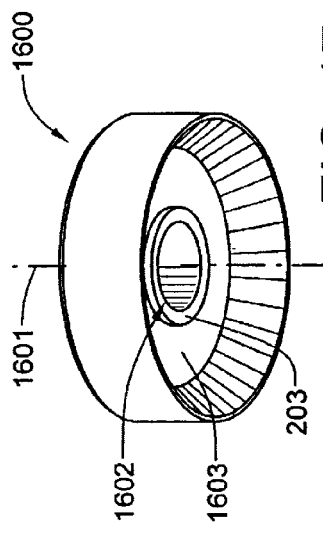
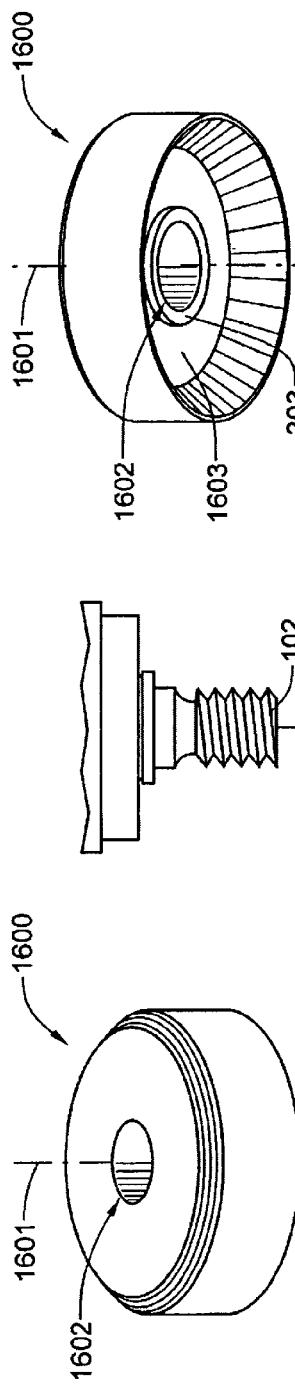
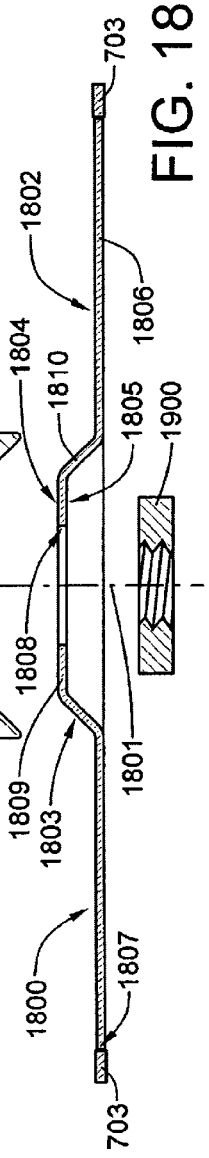
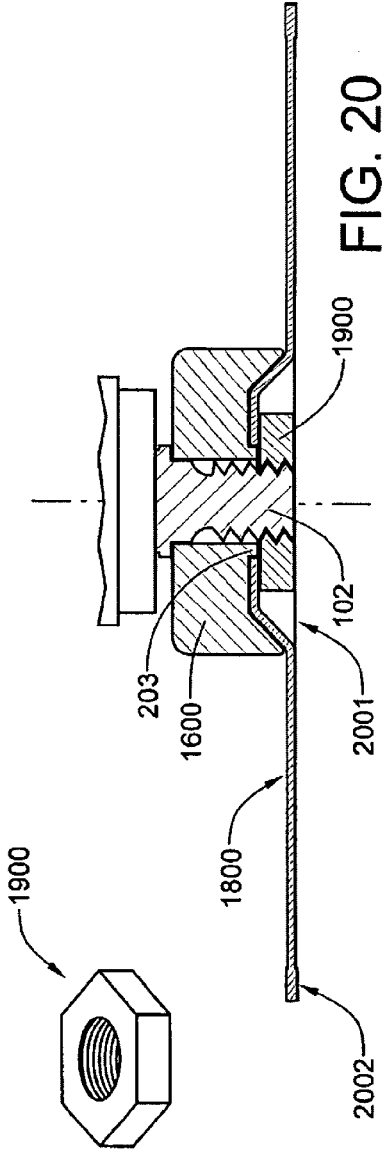

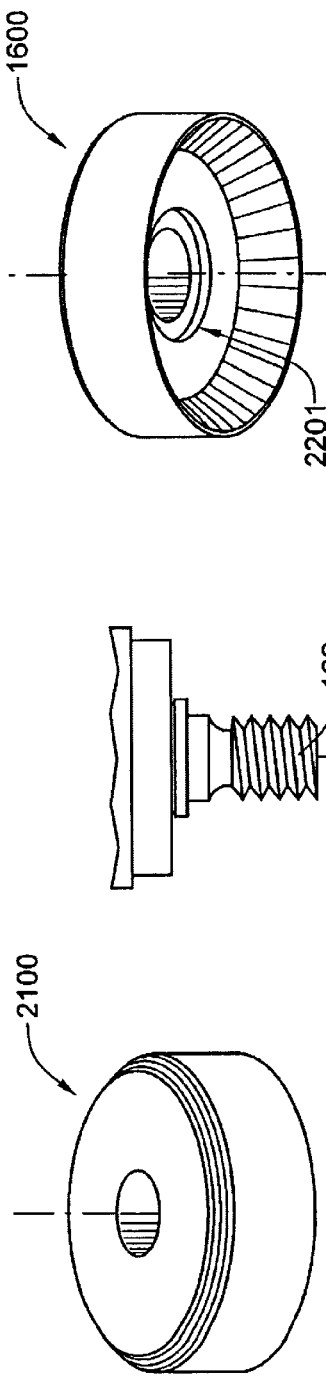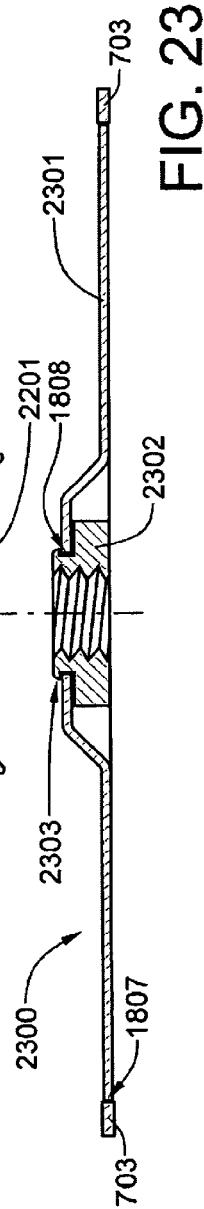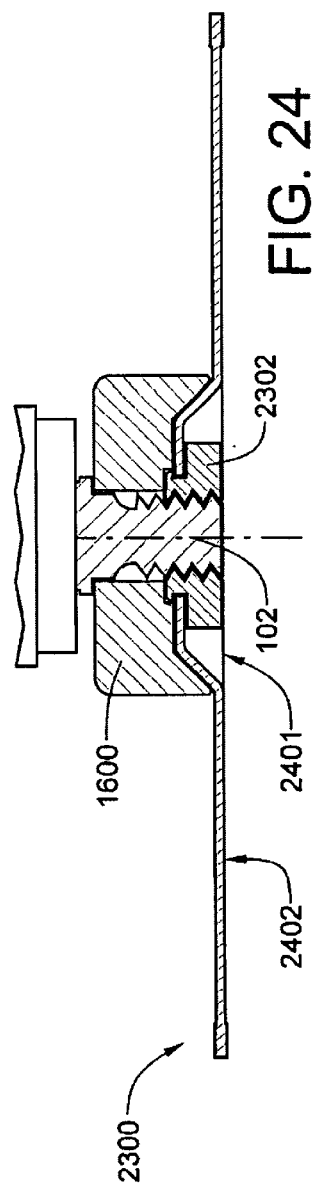

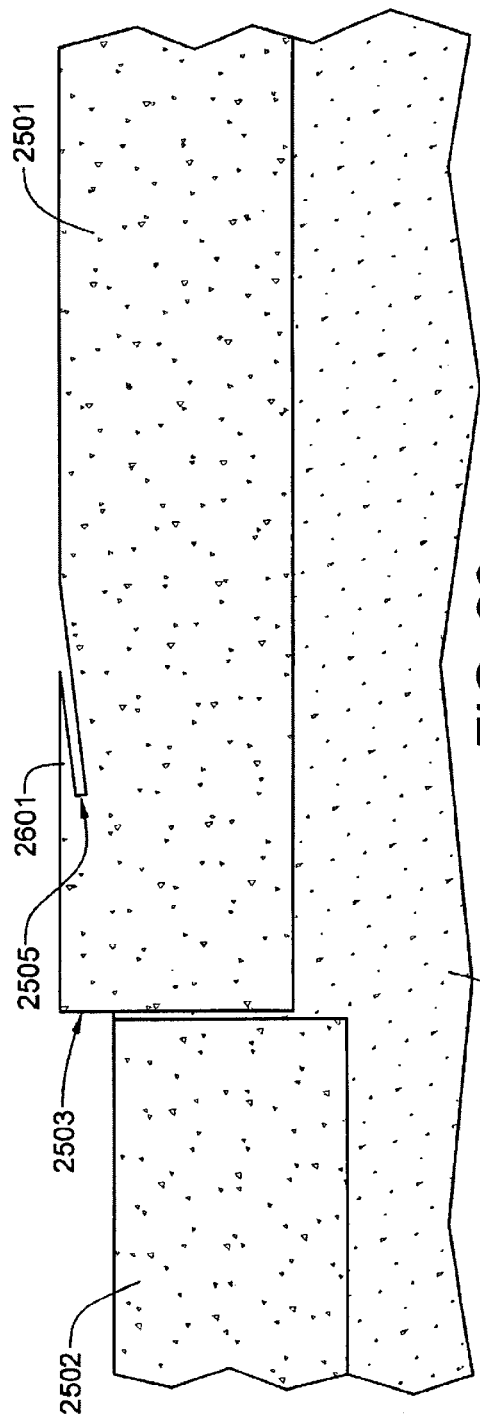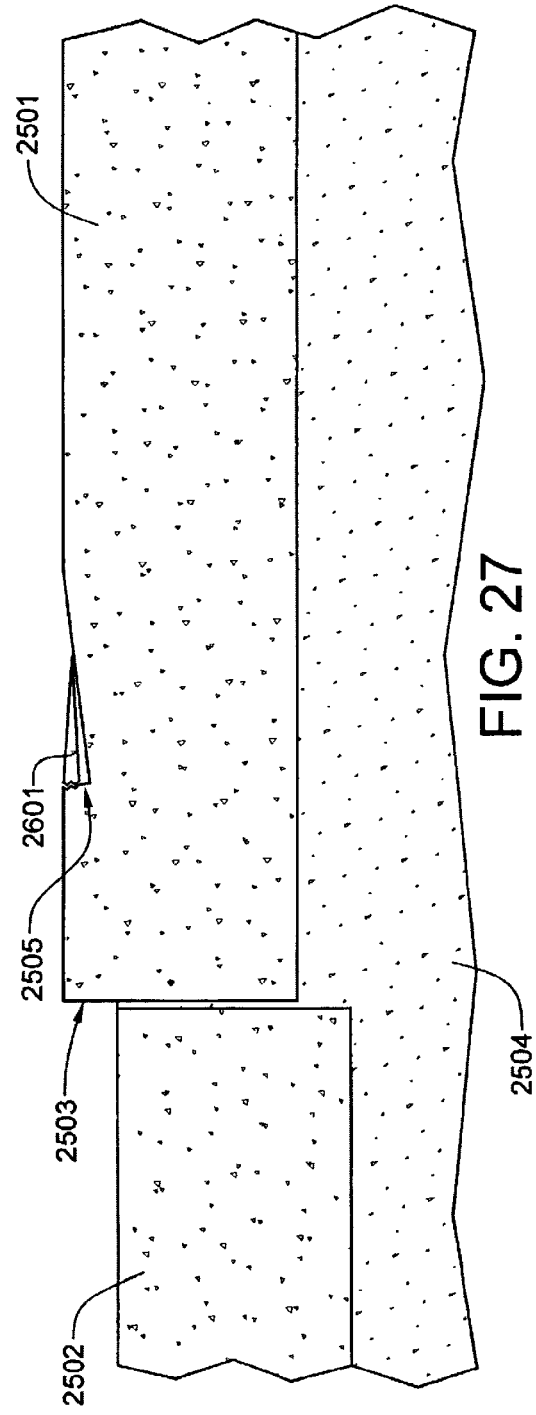

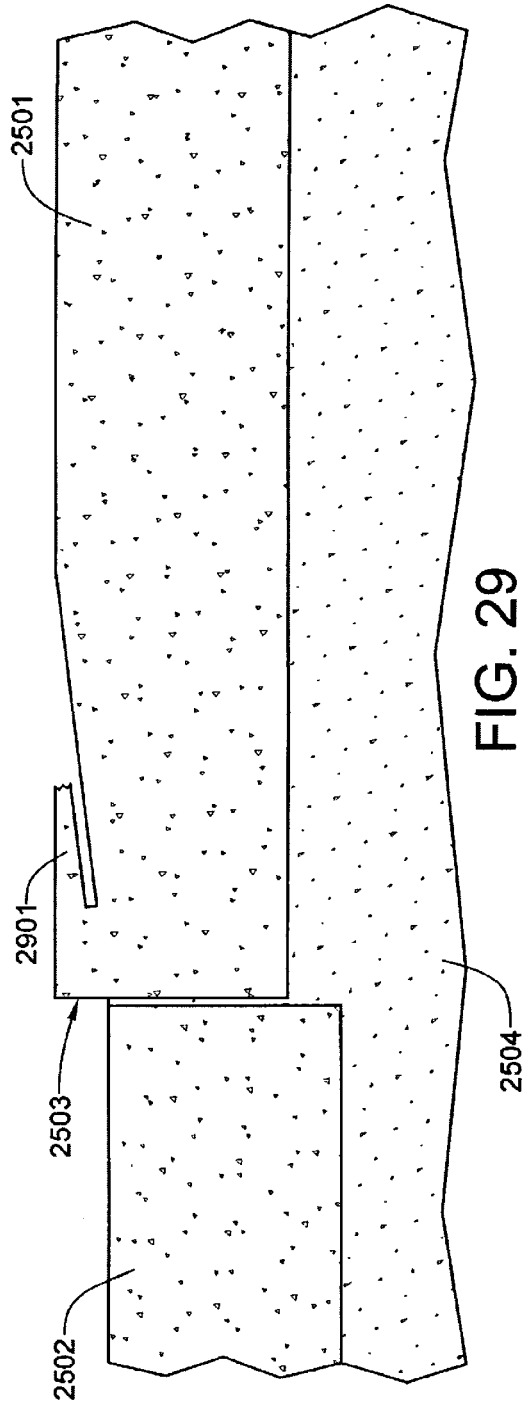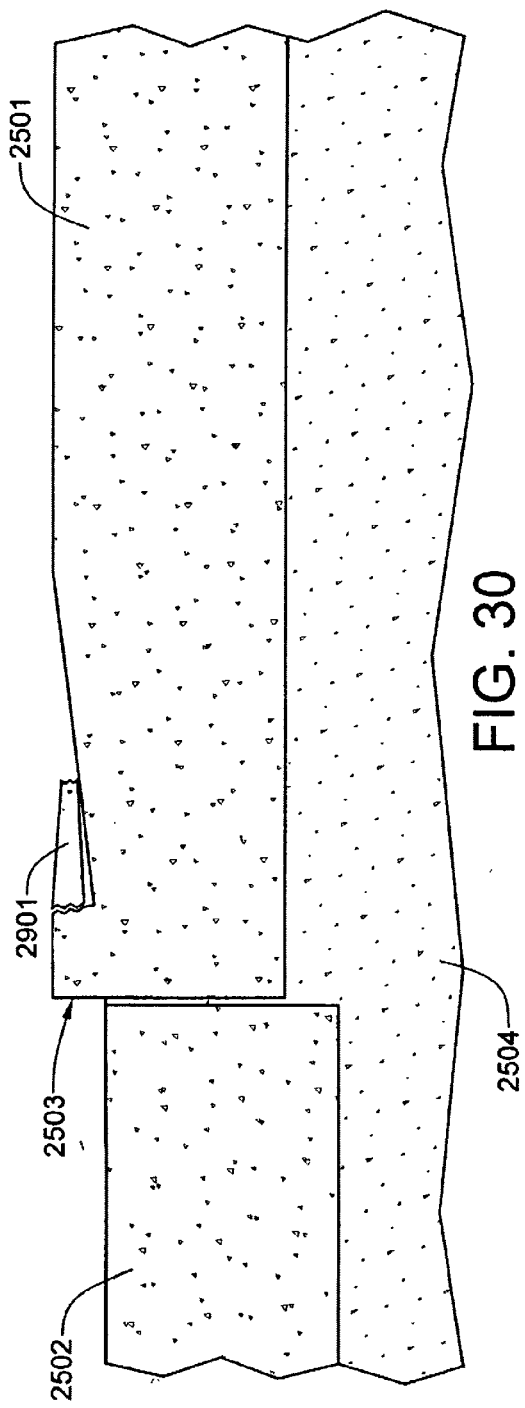

METHOD AND APPARATUS FOR REMOVING TRIP HAZARDS IN CONCRETE SIDEWALKS

BACKGROUND OF THE INVENTION

Signed into law as Section 12181 of Title 42 of the United States Code on Jul. 26, 1990, the Americans with Disabilities ACT (ADA) is a wide-ranging legislation intended to make American society more accessible to people with disabilities. The legislation, which took effect on Jul. 26, 1992, mandates, among other things, standards for access to public facilities, including public sidewalks. The law not only requires that curb cuts be made at intersections and crosswalks to facilitate wheelchair access, but also mandates specifications for slopes and transitions between two surfaces of different levels. Some of the relevant provisions of the law are as follows:

- 4.5.2 Changes in Level. Changes in level up to ¼ inch (6 mm) may be vertical and without edge treatment. Changes in level between ¼ inch and ½ inch (6 mm and 13 mm) shall be beveled with a slope no greater than 1:2. Changes in level greater than ½ inch (13 mm) shall be accomplished by means of a ramp that complies with 4.7 or 4.8.
- 4.72 Slope. Slopes of curb ramps shall comply with 4.8.2. Transitions from ramps to walks, gutters, or streets shall be flush and free of abrupt changes. Maximum slopes of adjoining gutters, road surface immediately adjacent to the curb ramp, or accessible route shall not exceed 1:20.
- 4.8.2 Slope and Rise. The least possible slope shall be used for any ramp. The maximum slope of a ramp in new construction shall be 1:12. The maximum rise for any run shall be 30 inches (760 mm). Curb ramps and ramps to be constructed on existing sites or in existing building or facilities may have slopes and rises as allowed in 4.1.6(3)(a) if space limitations prohibit the use of a 1:12 slope or less.
- 3-a-1. A slope between 1:10 and 1:12 is allowed for a maximum rise of 6 inches.
- 3-a-1. A slope between 1:8 and 1:10 is allowed for a maximum rise of 3 inches. A slope steeper than 1:8 is not allowed.

Public sidewalks and private sidewalks open to the public must comply with the foregoing provisions of the ADA. Tree roots are the single most significant cause of unlevel conditions of sidewalks. Because sidewalks are generally made of contiguous concrete slabs, unevenness typically occurs at the joints between the slabs. Unstable and inadequately compacted soils can also lead to differential settling of adjacent slabs.

Historically, trip hazards caused by uneven lifting and settling of contiguous sidewalk sections have been eliminated either by tearing out the old concrete and replacing it with new slabs having no abrupt transitions between joints, by forming a transition ramp on the lowermost section with macadam, or by creating a chamfer on the edge of the uppermost section. The first method represents the most expensive fix. The second method, which uses dark-colored macadam on a light-colored sidewalk, is unsightly. If the chamfer is made using a surface cutter or grinder, the second method is slow, given that all material removed through grinding must be pulverized. In addition, if the process is performed with a drum cutter, the equipment is relatively expensive and leaves a rough surface. In addition, most equipment used heretofore is incapable of removing the trip hazard over the entire width of a sidewalk. Furthermore, if two adjacent sidewalk slabs have twisted in opposite directions as they have settled or raised, it may be necessary to create a ramp across a portion of the width of the sidewalk on both sides of the joint.

What is needed is a new method and apparatus that will reduce the time required to form chamfers, that is capable of removing a trip hazard over the entire width of a sidewalk, and that is capable of chamfering portions of two intersecting slabs at a common joint. Ideally, the equipment and expendables required will be relatively simple and inexpensive, and will not require pulverization of all material removed during a chamfer operation.

SUMMARY OF THE INVENTION

The present invention provides both a method and apparatus for cutting a chamfer on an upper edge of a concrete slab. First and second embodiment apparatuses include a hub having a threaded aperture designed for installation on the threaded output spindle of an angle grinder, and a specially-modified diamond-grit-edged rotary blade which mounts on the hub. For a presently preferred embodiment of the hub, an attachment collar is unitary and concentric with both a blade mounting flange and a blade centering shoulder on the flange. The attachment collar is machined for a minimum clearance, self-centering fit on the output spindle to minimize imbalance conditions. The collar has at least one pair of flattened parallel sides for receiving a wrench used to tighten the hub on the output spindle. The side of the blade mounting flange opposite the collar is equipped with at least two, and preferably three or more, countersunk holes, by means of which the blade may be attached. The holes may be blind, or may penetrate the flange. In the former case, the holes are threaded. In the latter case, the holes are unthreaded and the screws are secured with self-locking nuts on the side of the collar side of the blade mounting flange. The rotary blade is equipped with a central positioning aperture sized to fit over the blade centering shoulder with a generally minimum amount of clearance required for a noninterference fit. The blade is equipped with countersunk holes which align with those on the blade mounting flange. Countersinking screws are employed to affix the blade to the blade mounting flange. When fully tightened in the countersunk holes in the flange, the head of each of the screws is flush with the surface of the blade. As the blade rotates and cuts into concrete, the lower surface of the blade may remain in contact with the lower cut surface. Because the hub will contact the concrete above the cut, that concrete must be periodically broken and removed to provide adequate clearance for the hub as the cut is continued.

Third and fourth embodiment apparatuses employ a hub having a central aperture machined for close tolerance mounting on the output spindle of the right-angle grinder. The blade has a core with a central recess. A nut, which engages the end of the output spindle, secures the blade to the hub and spindle. The nut may be separate from the blade assembly, in which case, the hub incorporates a blade centering shoulder which mates with a central positioning aperture in the blade core. Alternatively, the nut may be incorporated in the blade assembly. For example, the nut may be swedged within a central blade aperture. As will be hereinafter shown, certain modifications are made to the hub to accommodate the swedged nut.

With training, a skilled worker can make an angled chamfer cut into the edge of a raised concrete slab, so that a smooth transition between a lower slab and the raised slab may be formed.

BRIEF DESCRIPTION OF THE DRAWINGS

Drawing FIGS. 1–10 show a first embodiment apparatus; FIGS. 11–14, a second embodiment apparatus; FIG. 14, a blade guard; FIGS. 16–21, a third embodiment apparatus; and FIGS. 22–24 a fourth embodiment apparatus.

FIG. 1 is a side elevational view of a typical electric right-angle grinder;

FIG. 2 is a top plan view of a first embodiment hub;

FIG. 3 is side elevational view of the first embodiment hub, taken parallel to the wrench flats;

FIG. 4 is side-elevational see-through view of the first embodiment hub, taken perpendicular to the wrench flats;

FIG. 5 is an isometric top view of the first embodiment hub;

FIG. 6 is an isometric bottom view of the first embodiment hub;

FIG. 7 is a top plan view of the blade;

FIG. 8 is an exploded side elevational view of the right-angled grinder of FIG. 1, the hub of FIGS. 2–6, the blade of FIG. 7, and multiple countersinking screws, positioned for assembly;

FIG. 9 is a side elevational view of the right-angled grinder of FIG. 1, having installed thereon the hub of FIGS. 2–6 and the blade of FIG. 7;

FIG. 10 shows a piece of tile 904, an edge of which has been abraded to form a generally chamferred profile 1001 using the tool 300.

FIG. 11 shows a piece of tile 904, an edge of which here has been abraded to form a generally rounded profile 1101 using the tool 300.

FIG. 12 is an isometric top view of the second embodiment hub;

FIG. 13 is an exploded side elevational view of a portion of the right-angled grinder of FIG. 1, the hub of FIGS. 12–13, the blade of FIG. 7, and multiple countersinking screws, positioned for assembly;

FIG. 14 an enlarged cross-sectional view of a portion of the assembled components of FIG. 13, the view being comparable to that of FIG. 10;

FIG. 15 is a side elevational view of the right-angled grinder of FIG. 1, having installed thereon the hub of FIGS. 2–6, the blade of FIG. 7, and a blade guard trimmed to function with the blade and hub of the present invention;

FIG. 16 is an isometric top view of a third embodiment hub having an unthreaded central aperture;

FIG. 17 is an isometric top view of the third embodiment hub;

FIG. 18 is an exploded side elevational view of a portion of the right-angled grinder of FIG. 1, the hub of FIGS. 16–17, a specially designed blade having a core with a concave center region, and a retaining nut, all positioned for assembly;

FIG. 19 is an isometric view of the retaining nut first shown in FIG. 18;

FIG. 20 is a cross-sectional view of the assembled components of FIG. 18;

FIG. 21 is an isometric top view of a fourth embodiment hub having an unthreaded central aperture;

FIG. 22 is an isometric top view of the fourth embodiment hub;

FIG. 23 is an exploded side elevational view of a portion of the right-angled grinder of FIG. 1, the hub of FIGS. 21–22, a specially designed blade having a core with a concave center region, and an integral swedged retaining nut, all positioned for assembly;

FIG. 24 is a cross-sectional view of the assembled components of FIG. 23;

FIG. 26 is a side elevational view of the concrete slab, with the cutting equipment removed following the first cutting pass;

FIG. 27 is a side elevational view of the cut concrete slab of FIG. 26, following the fracturing of the first overhanging ledge;

FIG. 29 is a side elevational view of the concrete slab, with the cutting equipment removed following the second cutting pass;

FIG. 30 is a side elevational view of the cut concrete slab of FIG. 29, following the fracturing of the second overhanging ledge;

PREFERRED EMBODIMENT OF THE INVENTION

Figure 7:
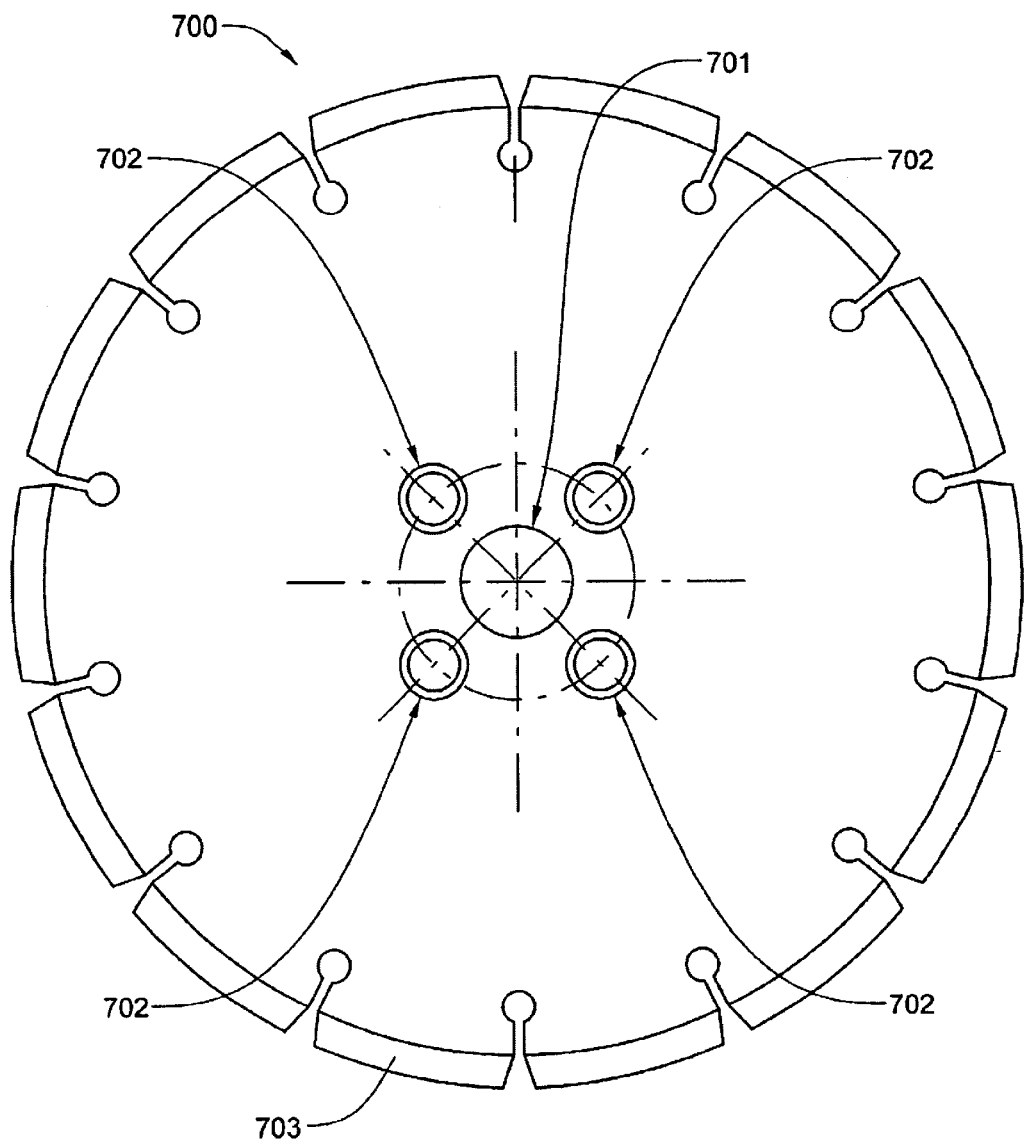

Various embodiments of an apparatus for cutting a chamfer on an upper edge of a concrete slab will now be described with reference to drawing FIGS. 1 through 24. Description of a method for cutting the chamfer will reference drawing FIGS. 25–32.

Referring now to FIG. 1, a typical right-angle grinder motor 100 is shown. The grinder motor 100 has a body 101, which encloses an electric drive motor, a cooling fan and a right-angle gear train (none of which are visible in this drawing). The grinder motor 100 has a rotatably powered threaded output spindle 102, a handle 103, a power switch 104, motor brush caps 105, cooling vents 106, and an electrical power cord 107. Although the invention will be shown in combination with an electrically-powered right-angle grinder, it will be obvious to those of ordinary skill in the art of grinding equipment that a compressed-air-powered right-angle grinder may be used in combination with the invention with equally satisfactory results.

Referring now to FIGS. 2 through 6, the apparatus of the invention comprises a hub 200 at is designed for installation on the threaded output spindle 102 of an angle grinder, such as the electric grinder motor 100 shown in FIG. 1. For a first and preferred embodiment of the hub 200, an attachment collar 201 is unitary and concentric with both a blade mounting flange 202 and a blade centering shoulder 203 on the flange 202. A central mounting aperture 204 passes through the collar 201, the flange 202, and the shoulder 203. The mounting aperture 204 is threaded to receive and engage the threaded output spindle 102 of the right-angle grinder motor 100. The attachment collar 201 has at least one pair of flattened parallel sides 205 for receiving a wrench used to tighten the hub 200 on the output spindle 102. The side 206 of the blade mounting flange 202 opposite the collar 201 is equipped with at least two, and preferably three or more, countersunk holes 207, by means of which a generally circular, diamond-grit-edged rotary blade may be attached with countersinking screws and self-locking nuts (not shown in this drawing figure).

Referring now to FIG. 7, the rotary blade 700 is equipped with a central positioning aperture 701 sized to fit over the blade centering shoulder 203 with a generally minimum amount of clearance required for a non-interference fit. The blade is equipped with non-threaded countersunk holes 702 which align with the threaded countersunk holes 202 on the blade mounting flange 202. Countersinking screws (shown in FIG. 8) are employed to affix the blade 700 to the blade mounting flange 202. When fully tightened in the countersunk threaded holes 202 in the flange 202, the heads of each of the screws is flush with the surface of the blade 700. Although it is possible to countersink only the holes 702 of the saw blade 700 and use specially designed screws having a very shallow countersinking head, conventional countersinking screws have greater structural integrity. The edge 703 of blade 700 is formed from a metal matrix which incorporates diamond grit throughout, which enables the blade, when rotating, to cut through "green" or seasoned concrete. For a presently preferred embodiment of the blade, the new diameter is 8 inches (about 203 mm), and the blade core has a thickness of about 0.55 inch. The height of the blade centering shoulder 203 is preferably also about 0.055 inch. If the blade centering shoulder were to protrude through the blade, the edges thereof would become peened over the edges of the blade centering aperture 701, thereby making removal of the blade difficult.

Referring now to the exploded assembly 800 of FIG. 8, an electrically-powered right-angle grinder motor 100 is shown together with the hub 200, the blade 700, multiple countersinking blade-attachment screws 801 and multiple self-locking nuts 802, all positioned for assembly as a unit. It will be noted that each of the self-locking nuts has a deformable polymeric insert 1005, which provides the self-locking function.

Referring now to assembled unit 900 of FIG. 9, the hub 200 has been installed on the output spindle 102 of the right-angled grinder motor 100, and the blade 700 has been secured to the hub 200 with the countersinking screws 801 and the self-locking nuts 802. It will be noted that the lower surface 901 of the blade 700 is completely flat, with no attachment hardware protruding below its surface.

Referring now to FIG. 10, the portion of FIG. 9 within the ellipse 10 is shown in cross-sectional format. In this detailed view, it is clearly seen that the attachment collar 201 is unitary and concentric with the blade mounting flange 202 and the blade centering shoulder 203 on the flange 202. The threads 1001 within the central mounting aperture 204, which have spirally engaged the threads 1002 on the output spindle 102, are clearly visible in this view. It will be noted that the head 1003 of each countersinking blade attachment screw 801 has a socket 1004. The blade attachment screws 801 are inserted through the countersunk holes 702 in the blade 700, through the holes 207 in the blade mounting flange 202 and secured with the self-locking nuts 802. Using an allen-type wrench which engages the sockets 1004, the screws 801 may be kept from rotating while the self-locking nuts 802 are tightened against the upper surface of the blade mounting flange 202, thereby securing the blade 700 to the hub 200. It will also be noted that the central positioning aperture 701 in the blade 700 is sized to fit over the blade centering shoulder 203 with a generally minimum amount of clearance required for a non-interference fit.

Referring now to FIGS. 11 through 14, a second embodiment of the hub 1100 is shown. Identical numbers are used for identical items of the first and second embodiments. The only difference between the first embodiment hub 200 and the second embodiment hub 1100 is that the latter has countersunk and threaded blade attachment holes 1201 in place of the self-locking nuts 802. Shorter screws 1301 may therefore be employed with this arrangement. It has been determined that the dust from the cutting process tends to cause the blade attachment screws 1301 to seize within the threaded holes, making it difficult to remove a blade 700 when it must be replaced. This problem may be solved by using blue Loctite® thread-locking and anti-seizing compound, or a similar product, when installing the blade. The thread-locking and anti-seizing compound seals the threads on both the screws 1301 and within the blade attachment holes 1201 from dust.

It should be mentioned that right-angle grinders are sold with a guard that shields the rear half of a grinding wheel. As grinding wheels are of generally greater thickness than a concrete cutting blade, the guard must be trimmed so that it does not extend beyond the lower surface of the concrete cutting blade. In this way, flush cuts are possible, even with the blade guard installed on the grinder motor. Referring now to FIG. 15, a guard 1501 is shown. The guard has been trimmed along the lower edge thereof so that it does not extend below the lower surface of the concrete cutting blade 700 when it is mounted on the hub 200, which is installed on the threaded output spindle 102 of the right-angle grinder 100.

Referring now to FIGS. 16 and 17, a third embodiment hub 1600 has an axis of rotation 1601, a central aperture 1602 coincident with the axis of rotation 1601, the aperture sized for close tolerance mounting on the output spindle 102 of the right-angle grinder 100, thereby minimizing rotational imbalances. It will be noted that the lower surface 1603 of the hub 1600 is recessed, and that the recessed lower surface 1603 incorporates a blade centering shoulder 203. The recessed lower surface 1603 acts as a backing surface to which the blade is mated.

Referring now to FIG. 18, a generally circular blade 1800 has an axis of rotation 1801, a generally laminar metal core 1802, and a metal matrix edge 703 affixed to a circumferential edge of the core 1802, the metal matrix edge being embedded with diamond grit. The laminar metal core 1802, which is preferably stamped from sheet steel, includes a center portion 1803 with a raised upper surface 1804 and an indented lower surface 1805, said core having a planar flange portion 1806 extending radially from the center portion 1803, said flange portion having an outer circular circumferential edge 1807, to which metal matrix edge 703 is affixed. At the very center of the center portion 1803 is a central mounting hole 1808 sized to snugly fit over the blade centering shoulder 203 of the hub 1600. When the blade 1800 is mounted to the hub, at least a portion of the raised upper surface 1804 mates with the lower surface 1603 of the hub 1600. Also shown in this exploded view is a nut 1900, which engages the threads on the end of the output spindle 102. The nut 1900 may be employed to secure the blade 1800 and the hub 1600 to the output spindle 102. For a preferred embodiment of the blade, the center portion 1803 of the core 1802 is bell shaped, having a circular central disk portion 1809, which incorporates the central mounting hole 1808, the central disk portion 1809 being coupled to a conical-shaped skirt portion 1810 that is, in turn, coupled to the flange portion 1806. For this particular embodiment of the blade 1800, the nut 1900 is biased against the lower surface of the circular central disk portion 1809 when the blade 1800 and hub 1600 are secured to the output spindle 102.

Referring now to FIG. 19, the nut 1900 is seen in more detail. The female threads 1901 are sized to spirally engage the male threads of the output spindle 102.

Referring now to FIG. 20, the individual components of FIG. 18 have been assembled into a single unit, with the nut 1900 securing both the hub 1600 and the blade 1800 to the output spindle 102. It will be noted that the indented lower surface 1805 provides a recess 2001 in which the nut 1900 is positioned when the hub 1600 and blade 1800 are secured to the output spindle 102, such that a straight edge may be placed in contact with any two segments of the metal matrix edge 703 on the lower surface 2002 of the blade without encountering an intervening obstruction. Thus, the blade 1800 is enabled to cut through concrete, unimpeded by blade attachment projections on the blade's lower surface 2002.

Referring now to FIGS. 21 and 22, a fourth embodiment hub 2100 is similar to that of FIGS. 16 and 17, with the exception that the blade centering shoulder 203 is replaced by a circular recess 2201.

Referring now to FIG. 23, the blade assembly 2300 also has a core 2301 that, for all practical purposes, is identical to the core 1802 of FIGS. 18 and 20. However, the top edge extension 2303 of the blade retaining nut 2302 is swedged around the central mounting hole 1808, so that the nut 2302 is integrated into the blade assembly 2300.

Referring now to FIG. 24, the individual components of FIG. 23 have been assembled into a single unit. It will be noted that the upper portion of the swedged blade retaining nut 2302 fits into the circular recess 2201 within the hub 2100. It will also be noted that as with the assembly of FIG. 20, the blade securing nut 2302 fits completely with the central recess 2401 of the blade assembly 2300, thereby allowing the bottom surface 2402 of the blade assembly 2300 to cut concrete unimpeded by blade attachment projections on that surface.

Figure 25:
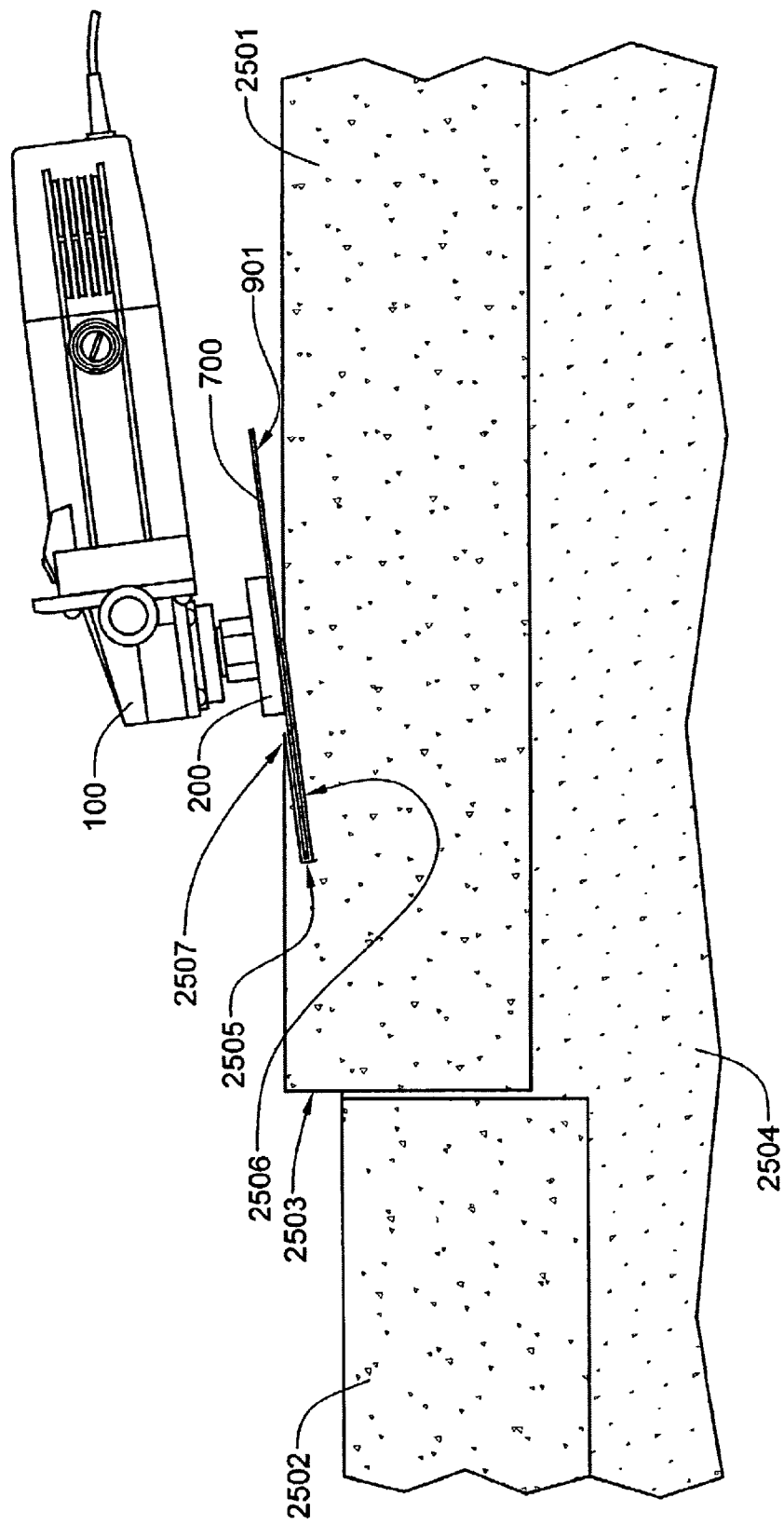
FIG. 25 is a side elevational view of the mounted blade making a first chamfer cut on the edge of a raised concrete slab.

Referring now to FIG. 25, it will be noted that, at the junction of a first concrete slab 2501 and a second concrete slab 2502, there is a trip hazard 2503 that has been caused by the first slab 2501 being raised with respect to the second slab 2502. Removal of the trip hazard, by making a dry chamfer cut on the first concrete slab 2501, will now be described in detail with reference to the remaining drawing figures. The chamfer, when complete, will have a 1:8 rise. Both slabs 2501 and 2502 rest on a substrate 2504 of gravel, sand or soil. Using the right-angle grinder motor 100 with the hub 200 and blade 700 mounted thereon, a first chamfer cut 2505 is made on the edge of concrete slab 2501, which has raised with respect to the second concrete slab 2502. It will be noted that the bottom surface of the blade 901 is in close proximity to the lower cut surface 2506. However, as heads 1003 of the blade-attachment screws 801 are flush with the lower surface of the blade 700, they are shielded from abrasive action of the concrete within the cut 2505. In order to protect the hub 200 from abrasion by the concrete, the cut must stop before the rotating hub 200 contacts the upper edge 2507 of the cut concrete. Using a blade having a diameter of about 8 inches (about 203 mm), a 2.375 inch deep cut may be made without endangering the hub.

Referring now to FIG. 26, the blade has been removed from the cut 2505. It will be noted that a first cantilevered ledge 2601 extends over the cut 2505.

Referring now to FIG. 27, the cantilevered ledge 2601 has been fractured by hitting it with a hammer or other similar instrument.

Figure 28:
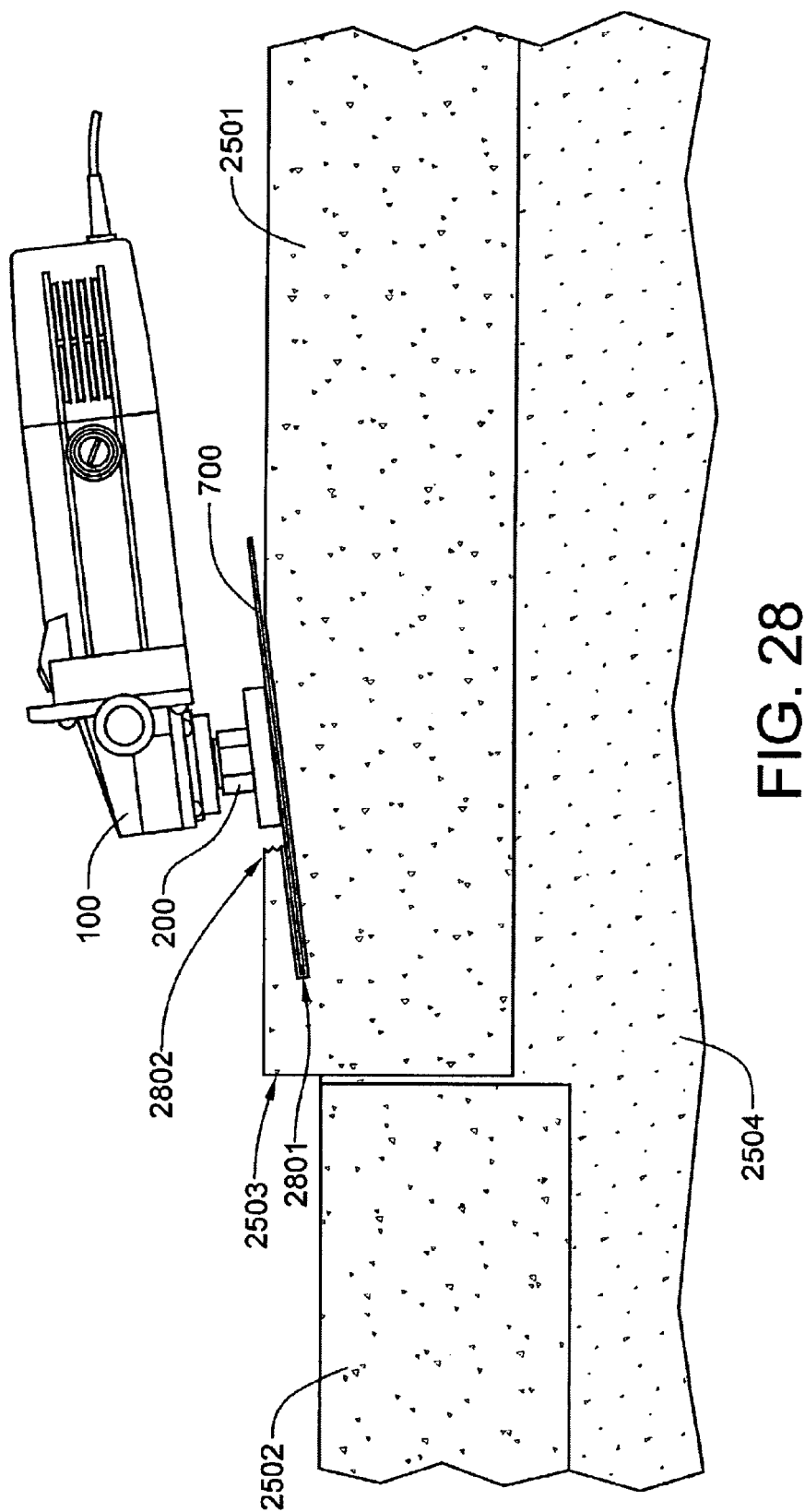
FIG. 28 is a side elevational view of the mounted blade making a second chamfer cut on the edge of the raised concrete slab shown in FIG. 25.

Referring now to FIG. 28, a second chamfer cut 2801 is made, which is a continuation of the first chamfer cut 2505. Once again, in order to protect the hub 200 from abrasion by the concrete, the cut must stop before the rotating hub 200 contacts the upper edge 2802 of the cut concrete.

Referring now to FIG. 29, the blade has been removed from the cut 2801. It will be noted that a second cantilevered ledge 2901 extends over the cut 2801.

Referring now to FIG. 30, the second cantilevered ledge 2901 has been fractured by hitting it with a hammer or other similar instrument.

Figure 31:
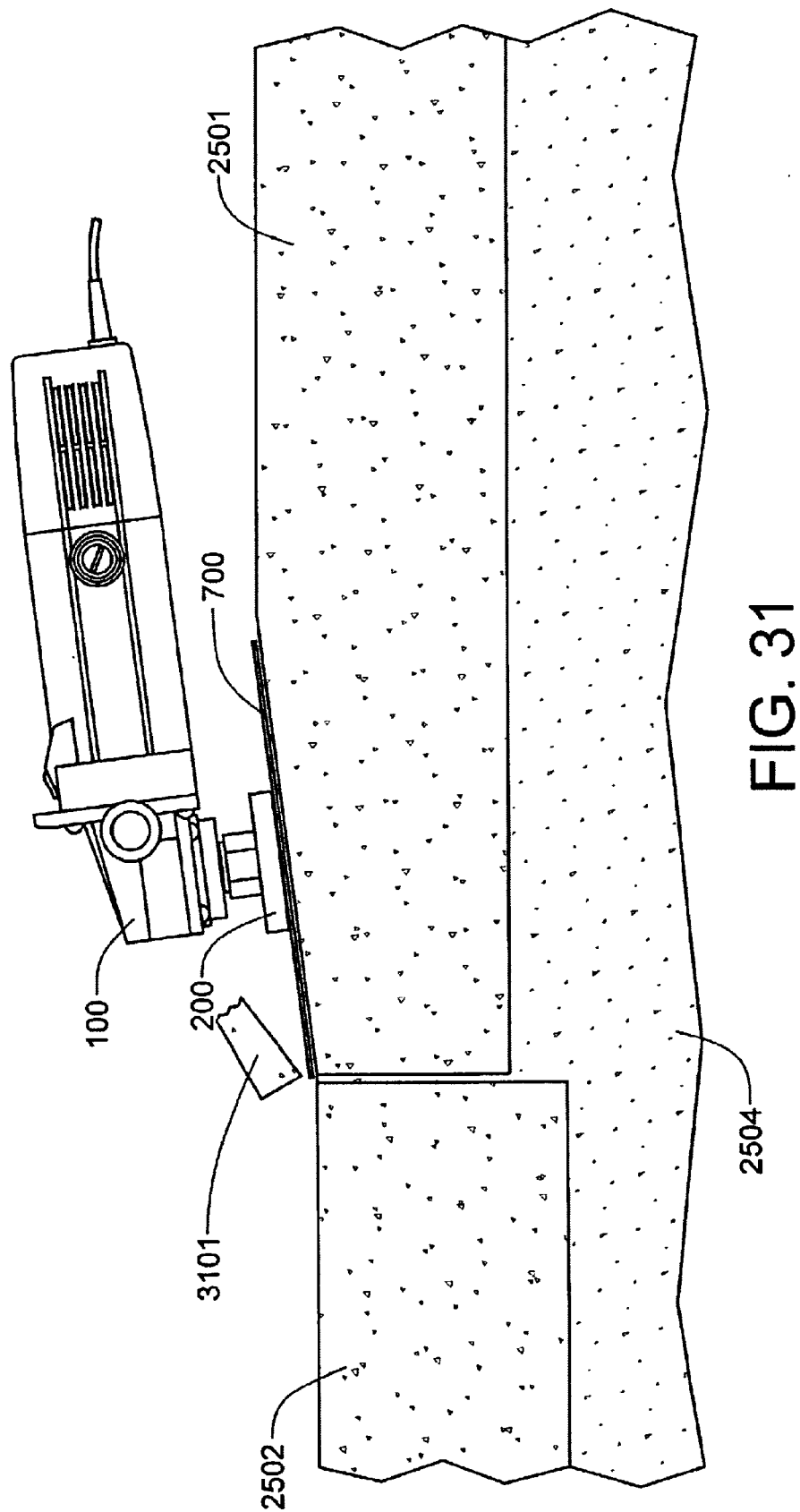
FIG. 31 is a side elevational view of the mounted blade making a third chamfer cut on the edge of the raised concrete slab shown in FIG. 25.

Referring now to FIG. 31, a third chamber cut has been made which removes the remainder 3101 of the trip hazard 2503.

Figure 32:
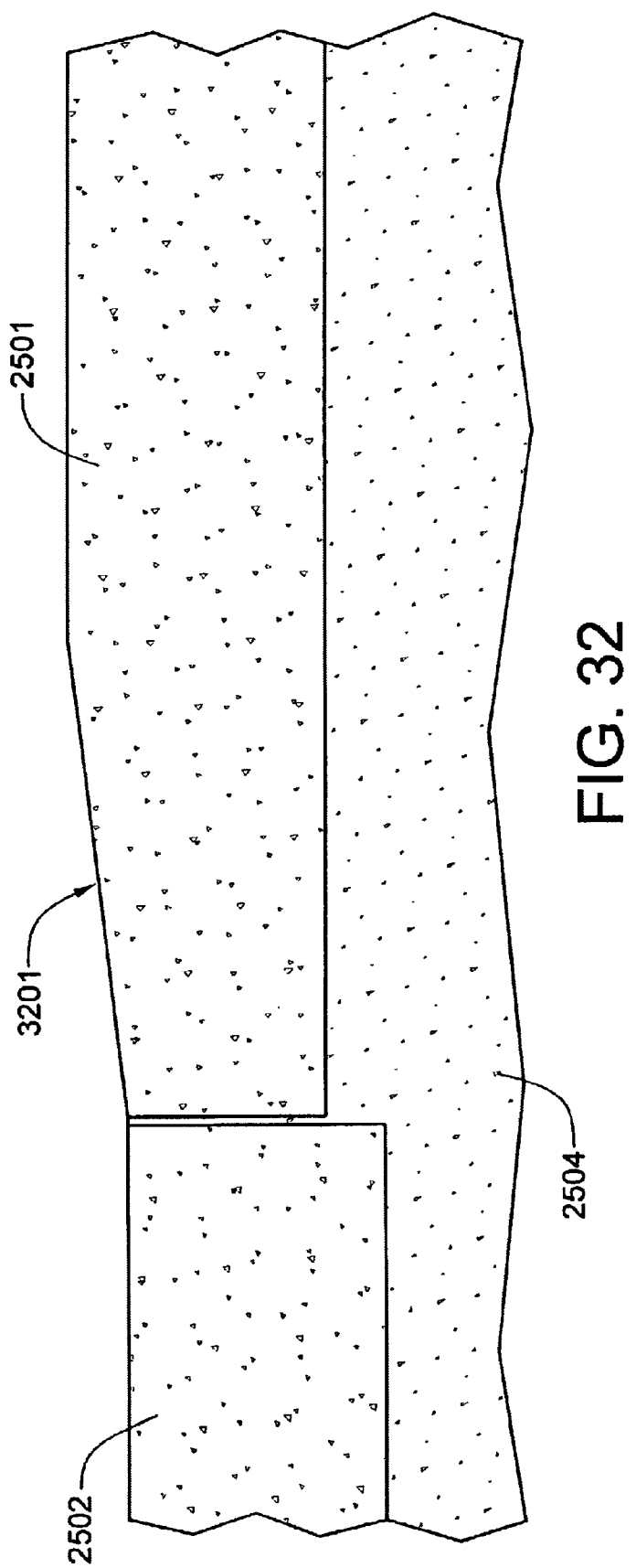
FIG. 32 is the concrete slab shown in FIG. 25 following completion of the chamfer cut, and removal of the cutting equipment and debris.

Referring now to FIG. 32, the first concrete slab 2501 is shown with the a completed chamfer cut 3201. The cutting equipment, which consists of the right-angle grinder motor 100, the attached hub 200 and blade 700, have been removed, as have been the trip hazard debris pieces 2601, 2801 and 3101.

With training, a skilled worker can make an angled chamfer cut into the edge of a raised concrete slab, so that a smooth transition between a lower slab and the raised slab may be formed. Trip hazards of slightly more than 2.54 cm height can be removed in using three cuts with an eight-inch blade. Trip hazards of nearly two inches in height can be removed with additional cuts, using the invention as heretofore described.

Although only several embodiments of the apparatus and a single embodiment of the cutting method have been heretofore described, it will be obvious to those having ordinary skill in the art that changes and modifications may be made thereto without departing from the scope and the spirit of the invention as hereinafter claimed.

What is claimed is:

1. In combination with a right angled grinder motor having a threaded, rotatable output spindle, an apparatus for making chamfer cuts on the edges of concrete slabs, the apparatus comprising:

a hub having an attachment collar, a blade mounting flange, and a blade centering shoulder on a lower surface of the flange, said collar, said flange and said shoulder being machined as a unit, said collar having a central mounting aperture that is threaded to spirally engage the output spindle, said flange being equipped with multiple unthreaded blade attachment holes said collar having at least one pair of flattened parallel sides sized to receive a wrench, with which said hub may be tightened onto said threaded output spindle;

a generally circular blade having metal matrix edge in which diamond grit is embedded, said blade having a central positioning aperture sized to fit over the blade centering shoulder, said blade also having multiple countersunk holes which align with the blade attachment holes of the flange;

multiple blade attachment screws having countersinking heads, each said blade attachment screw passing, firstly, through a countersunk hole in the blade so that its countersinking head is flush with a lower surface of the blade and, secondly, through a blade attachment hole; and a nut for threadably engaging each said blade attachment screw, each nut being biased against an upper surface of the flange, thereby securing the blade to the hub.

2. The combination of claim 1, wherein each of said blade attachment holes in said flange are countersunk to receive a portion of the countersinking head of a blade attachment screw.

3. The combination of claim 1, wherein each of said nuts is of a self-locking type.

4. The combination of claim 1, wherein said hub is generally symmetrical about an axis of rotation passing through the center of said mounting aperture.

5. The combination of claim 1, wherein the blade attachment holes in said flange are perpendicular to the axis of rotation, and evenly spaced about said axis.

6. A cutting apparatus mountable on the spindle of a rotatable threaded output spindle of a right-angle grinder motor, said cutting apparatus comprising:
- a hub having an axis of rotation and an attachment collar with a central mounting aperture coincident with said axis, said aperture being threaded to spirally engage the output spindle, said collar having at least one pair of flattened parallel sides sized to receive a wrench, with which said hub may be tightened onto said threaded output spindle;
- a generally circular blade having an axis of rotation, a metal matrix edge in which diamond grit is embedded, an upper major surface which mates to said hub, said blade also having a plurality of countersunk attachment holes perpendicular to said axis of rotation; and
- a nut and a blade attachment screw having a countersinking head for each attachment hole, said blade attachment screws and associated nuts being threadably engagable to secure said blade to said hub such that the head of each screw is flush with a lower surface of said blade.

7. The cutting apparatus of claim 6, wherein said hub includes a flange having multiple blade attachment holes which align with the countersunk attachment holes of said blade.

8. The cutting apparatus of claim 7, wherein said hub further includes a blade centering shoulder on a lower surface of said flange, and said blade further includes a central positioning aperture sized to mate with said shoulder in a non-interference fit.

9. The cutting apparatus of claim 7, wherein said blade attachment holes are threaded to engage the blade attachment screws.

10. The combination of claim 7, wherein said blade attachment holes are unthreaded, and the nuts, when they have engaged their respective blade attachment screws, are biased against an upper surface of the flange.

11. A cutting apparatus mountable on the spindle of a rotatable threaded output spindle of a right-angle grinder motor, said cutting apparatus comprising:
- a hub having an axis of rotation and a central mounting aperture coincident with said axis, said aperture sized to fit over the output spindle, said hub having a lower blade backing surface;
- a generally circular blade having an axis of rotation, a generally circular laminar metal core formed so as to have a center portion with a raised upper surface and an indented lower surface, said core having a planar flange portion extending radially from the center portion, said flange portion having an outer circular circumferential edge, said blade having a metal matrix edge affixed to the circumferential edge of the flange portion, said metal matrix edge being embedded with diamond grit, said center portion having a central mounting hole sized to fit over the output spindle, at least a portion of said raised upper surface mating with the lower blade backing surface of said hub; and
- a nut having a top edge extension is swedged within the central mounting hole, said nut sized to spirally engage the threads of the output spindle, and thereby secure the blade and the hub to the output spindle.

12. The cutting apparatus of claim 11, wherein said core is formed from a single piece of sheet steel.

13. The cutting apparatus of claim 12, wherein the center portion of said core is bell shaped, having a circular central disk portion which incorporates the central mounting hole, said central disk portion being coupled to a conical-shaped skirt portion that is, in turn, coupled to the flange portion.

14. The cutting apparatus of claim 13, wherein the nut is biased against the circular central disk portion when the blade and hub are secured to the output spindle.

15. The cutting apparatus of claim 14, wherein the core's indented lower surface provides a recess in which the nut is positioned when the hub and blade are secured to the output spindle, such that a straight edge may be placed in contact with any two segments of the metal matrix edge on the lower surface of the blade without encountering an intervening obstruction.

16. The cutting apparatus of claim 11, wherein the lower surface of the hub is recessed to receive at least part of the raised center portion of the core.

* * * * *